Aug. 21, 1923.
A. E. DRISSNER
1,465,256
PUSH CHUCKING MECHANISM
Filed May 17, 1921    2 Sheets-Sheet 1
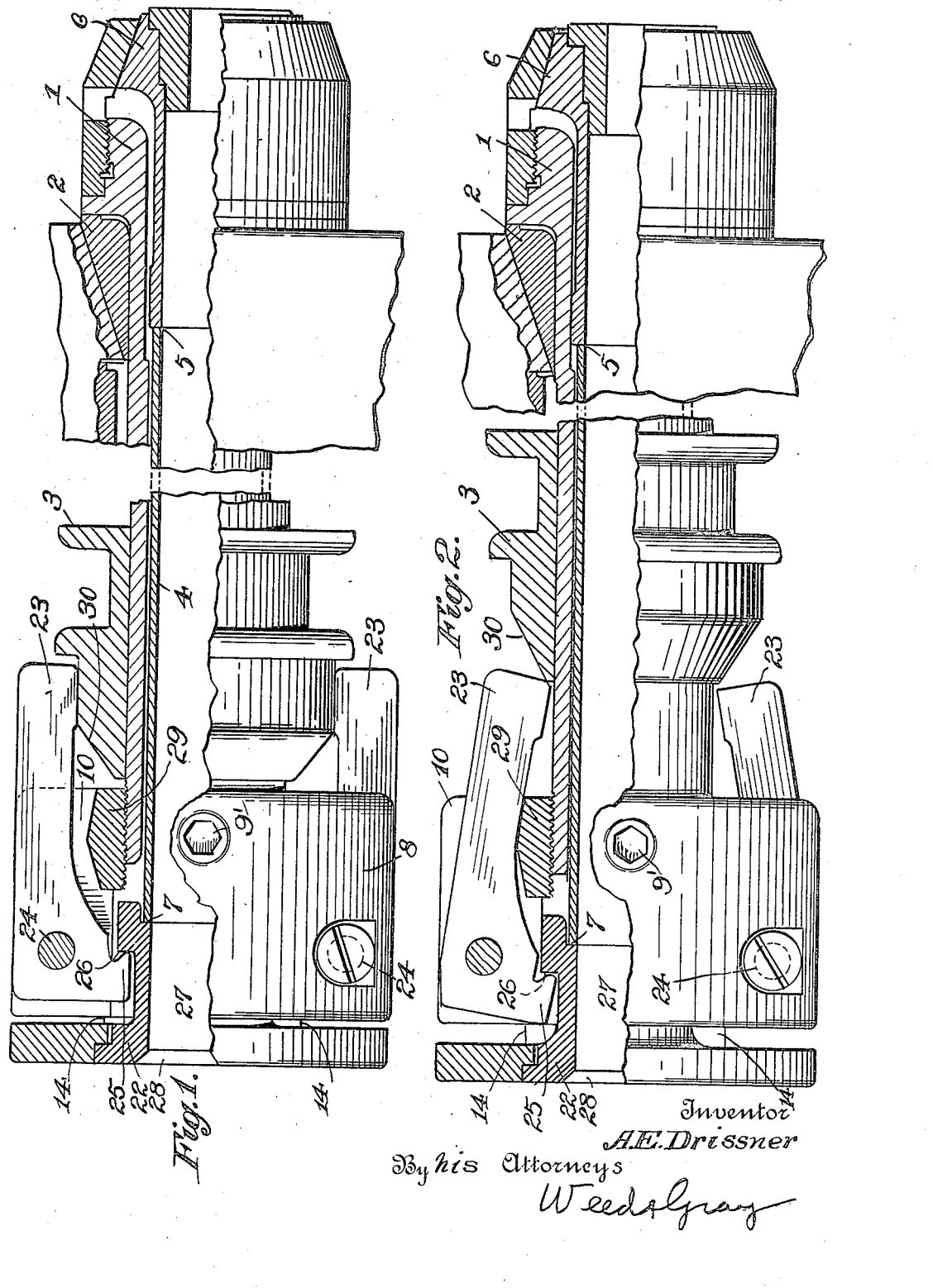
Inventor
A.E.Drissner
By his Attorneys
Weed & Gray

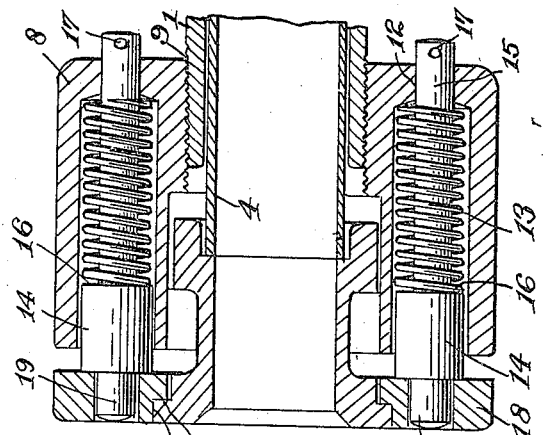

Patented Aug. 21, 1923.

1,465,256

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

PUSH CHUCKING MECHANISM.

Application filed May 17, 1921. Serial No. 470,477.

*To all whom it may concern:*

Be it known that I, ALFRED E. DRISSNER, a citizen of the United States, residing at 1842 E. 81st St., Cleveland, in the county of Cuyahoga and State of Ohio, have invented certain new and useful Improvements in Push Chucking Mechanism, of which the following is a specification.

This invention relates to push chucking mechanism particularly adapted and designed to be employed in conjunction with revolving or stationary spindles, such for instance, as are used in multiple and single spindle automatic lathes, hand screw machines, bar forming machines, lathes, and other machines, an object of the invention being to provide an improved chucking mechanism of this type which can be easily and economically manufactured, will be efficient and effective in operation and durable and serviceable in use.

By a push chucking mechanism is meant such mechanism which operates to force or push the chuck toward the nose or front end of the spindle thereby causing the jaws of the chuck to travel forwardly by virtue of the cooperating tapered faces of the chuck and the nose of the spindle thereby to close or grip the work.

Other objects of this invention will appear in the following description thereof, reference being had to the accompanying drawings forming part of this specification, wherein like reference characters indicate corresponding parts in the several views, and wherein Fig. 1 is a side view partly in section, and parts being broken away, illustrating the chucking mechanism in its closed or operative position; Fig. 2 is a similar view but illustrating the chucking mechanism in its open or inoperative position; Fig. 3 is an end view of my improved chucking mechanism substantially as illustrated in Fig. 1; Fig. 4 is a detail longitudinal sectional view taken substantially on line 4—4 of Fig. 3 and illustrating certain of the operating parts in a closed or operative position; and Fig. 5 is a similar view illustrating such operating parts in their normal or inoperative position, With reference to the drawings, it will be seen that the fingers or levers which are utilized for the purpose of operating the jaws of the chuck are pivoted to a finger holder interiorly thereof and are so mounted with relation to the spindle that the fingers or levers will not spread due to centrifugal force irrespective of the speed of revolution of the spindle.

In the present instance furthermore, the springs utilized for the purpose of retaining the fingers and the push mechanism in normal or inoperative position are carried interiorly of the finger holder and are completely incased therein. As a result of this construction, the danger of the springs becoming displaced or flying off and causing the fingers to spread and thereby operate the chucking jaws is obviated. This disadvantage has been found to be prevalent in many chucking devices heretofore constructed, where the springs are mounted exteriorly, as for instance, around the outside of the finger holder. Furthermore the finger holder is mounted for adjustment on the spindle, and hence the grip of the operating jaws of the chuck on the work may be varied or adjusted merely by adjusting the position of the finger holder on the spindle together with the chuck and the thrust receiving mechanism.

Another disadvantage of many chucking mechanisms heretofore constructed resides in the fact that the pivoted operating fingers or levers when released are liable to strike the spindle and injure the same. In the present instance however, the construction is such that when the fingers are forced by the springs to travel toward the spindle in the operation of unchucking the same are limited or arrested a suitable distance from the spindle, thereby preventing the fingers or levers from striking the spindle and consequently marring the same, so that the sliding wedge is not hampered in its free movement over the spindle. In many chucking devices heretofore constructed, a cover is often provided for housing the fingers and for holding the same from spreading, as a result of centrifugal force, but the disadvantage of such construction resides in the fact that where the fingers are not constructed perfectly or exactly alike and the hole in the cover is not machined perfectly, only one finger is forced down by the cover, thereby causing the same to cramp and dig into the spindle. Also in the present invention the finger holder and the thrust receiving member, which is actuated by the movement of the fingers to shift or push the chucking jaws to their closed or operative position, are mounted so as to be axially shiftable one relatively to the other and at the same time so as to have their juxtaposed faces at all times in fixed and positive relation to each other, the one revolving with the other as a unit. As a result therefore, the thrust end of each finger when actuated engages the thrust receiving member uniformly at a predetermined point. It will be readily seen therefore, that if desired, these predetermined thrust receiving points alone may be hardened, as for instance, the thrust member may be provided with individual hardened thrust receiving parts.

With reference to the drawings illustrating a preferred embodiment of my invention, the same comprises a spindle, 1, mounted in a suitable bushing 2. Over the rear end of the spindle 1 is mounted a sliding wedge or cone-shaped sleeve 3 suitably machined so as to slide freely over the spindle. A push tube 4 is inserted within the spindle 1, the forward end 5 thereof contacting with the rear end of the chuck 6 and the opposite end 7 of the push tube protruding a suitable distance beyond the rear end of the spindle.

On the rear end of the spindle a finger or lever holder 8 is mounted for adjustment as by means of threads 9, the finger holder being normally held from movement on the spindle by means of a hollow set screw 9'. A pair of slots 10 are machined to the desired width and depth in the outside face of the finger holder 8, the slots being preferably located diametrically opposite each other on a vertical plane through the center line of the finger holder, as illustrated in Fig. 3, and are provided for the purpose of receiving and housing the operating fingers or levers as hereinafter described.

Into the rear face of the finger holder four holes 11 of any desired diameter are drilled, each hole being preferably positioned substantially thirty degrees from the horizontal plane passing through the center line of the spindle. Concentric holes 12 of smaller diameter are continued through the front face of the finger holder. Springs 13 are placed or inserted in the holes 11 and are held in position therein by means of plungers 14 provided with elongated stems 15 projecting through the center of the springs and through the holes 12 in the finger holder. The springs 13 are held between the front inner walls of the holes 11 and the flanges or shoulders 16 of the plungers. Cotter pins 17 may be placed in suitable holes in the ends of the stems 15, as a precautionary measure, so as to prevent withdrawal of the plungers from the finger holder.

A thrust ring 18 is mounted adjacent to the rear end of the finger holder 8 and four holes are drilled therethrough for the purpose of receiving the short stems 19 of the plungers 14, the rear shoulders or flanges of the plungers being adapted to engage the inner face of the thrust ring 18. It will be seen therefore, from this construction that by virtue of the plungers 14 resiliently interconnecting the finger holder and thrust ring by means of springs 13, the juxtaposed faces of these parts are maintained in constant and fixed relation to each other, the resilient connection permitting axial movement of one relatively to the other.

Through the center of the thrust ring 18 is drilled a hole 20 of suitable diameter which is counter-bored to form a shoulder 21 as illustrated in Figs. 4 and 5 particularly. A thrust collar 22 is then inserted or placed into position so that a flange machined in it rests against or engages the shoulder 21 of the counter-bore.

The operating fingers or levers 23 are mounted in slots 10 in the finger holder 8 as hereinbefore set forth. These fingers are pivotally held in the finger holder 8 preferably by means of pivot screws 24. The hook or thrust end 25 of each finger 23 is adapted to engage or contact with a shoulder 26 formed in the thrust collar 22. This thrust collar may be provided at predetermined points with hardened parts for the purpose of receiving the thrust of the juxtaposed thrust ends of the fingers or levers 23. Inasmuch as the thrust ring with its thrust collar together with the finger holder normally rotate as a unit, although shiftable axially relatively to each other, their juxtaposed faces thus having a fixed relation to each other, the fingers 23 at all times will contact at predetermined points on the thrust collar 22, and hence it is merely necessary to provide hardened parts for engagement with the bearing ends of the fingers. The thrust collar is also drilled through the center as at 27, and countersunk as at 28 to a suitable depth and diameter. The push tube 4 at its rear end 7 rests against a shoulder formed in the thrust collar 22.

It will be seen with reference to Figs. 1 and 2 that the slots 10 are formed with a base 29 adapted to act as a stop for arresting the movement of the fingers 23 relatively to the spindle. Thus the fingers as illustrated are prevented by virtue of this limiting or stop means 29 from striking the spindle, and marring the same, which as hereinbefore stated, would result in hampering or interfering with the free sliding movement of the sliding wedge 3 over the spindle.

In the operation of my improved chucking mechanism, it will be observed that as the wedge or sleeve 3 is forced by any suitable means to travel rearwardly in the direction of the fingers 23 the conical or inclined face 30 thereof will engage the front portions of the fingers and will force the same outwardly. This travel of the wedge or sleeve will continue until the inner flat faces of the fingers 23 rest upon the flat surfaces of the wedge, holding them in a positive operative position as illustrated in Fig. 1. It will be seen that as the fingers 23 travel outwardly in this manner, the thrust or pull ends 25 engage the hardened thrust receiving parts 26 of the thrust collar 22, such hooked thrust ends or pull ends traveling during this operation toward the front end of the spindle. The thrust collar therefore will be forced in the direction of the front end of the spindle and the pull tube 4 being in contact therewith, will be forced to travel in the same direction conjunctively therewith. The front end of the pull tube 4 being in contact at 5 with the chucking jaws 6, will force the same forward during this operation and cause the jaws to close and clamp or grip the work. The thrust collar 22 being in engagement with the thrust ring 18 as at 21, the thrust ring will travel forwardly in conjunction with the thrust collar as illustrated in Figs. 1 and 4, causing the springs 11 to be compressed or placed under tension.

In the operation of unchucking or freeing the work, the wedge 3 will be forced to travel in the opposite direction away from the finger holder 8. The springs 13 being under compression at this time, will force the thrust ring 18 rearwardly carrying with it the thrust collar 22, and as a result the shoulders or thrust receiving parts 26 of the thrust collar will act to pull the hooked or pull ends 25 of the fingers rearwardly thereby forcing the front ends of the fingers to travel down the inclined or conical faces 30 of the sliding wedge in the direction of the spindle. It will be seen that the springs 13 exert a positive and continuous action upon the thrust ring 18 and as a result, as the fingers are shifted inwardly toward the spindle, the thrust collar 22 is held firmly against the thrust ends 25 of the fingers, thus holding the fingers in place at all times and preventing the centrifugal force of the revolving spindle from throwing the fingers away from the spindle and causing the chuck to grip the work.

It will be understood of course, that as the thrust collar and thrust ring move away from the finger holder by virtue of the action of the springs 13, the fingers at the same time traveling over the inclined faces of the sliding wedge toward the spindle, the push tube 4 and the chucking jaws 6 will simultaneously travel rearwardly thereby causing the jaws to release their grip upon the work. It will also be understood that the size of the springs 13 may be varied according to the speed of revolution of the spindle, the greater the speed of revolution the larger the springs used. Hence irrespective of the rate of speed of the spindle, the direct and positive action of the springs will overcome the centrifugal force tending to throw the fingers outwardly.

It will be seen that by having the finger holder 8 threaded to the rear end of the spindle, means are thereby provided for adjusting the grip of the chucking jaws on the work. By shifting the finger holder rearwardly or in a direction away from the wedge, the thrust collar 22 will be forced in the same direction, resulting in lessening the grip of the chucking jaws upon the work. If it is desired to tighten the grip of the chuck upon the work, the finger holder will be shifted forwardly upon the spindle 1.

Thus, it will be seen that by mounting the spring 13 interiorly of the finger holder the danger of the springs flying off and becoming displaced is entirely eliminated, and furthermore by mounting the operating fingers or levers 23 interiorly of the finger holder, greater durability and effectiveness will be given to these parts in operation.

Although I have described my invention in its preferred form, it is to be understood that I do not limit myself to the construction herein shown and described, except insofar as defined in the claims and embraced within the scope thereof.

I claim as my invention:

1. Chucking mechanism comprising in combination a chuck, a thrust member and a finger holding member, fingers operative for moving one relatively to the other in one direction, and means for interconnecting said members; said means comprising a spring carried interiorly of one thereof, and operative to cause relative movement of said members in the opposite direction.

2. Chucking mechanism of the class described comprising a chuck, a thrust member and a finger holding member shiftable relatively to each other in one direction for operating said chuck, and resilient means for interconnecting said members and having a part carried interiorly of each thereof and effective to cause shiftable movement of said members in the opposite direction.

3. Chuck operating mechanism of the class described comprising in combination a chuck, a thrust member, a finger holding member, and fingers operative to shift one member relatively to the other, resilient means for interconnecting said members and comprising a spring, and a pin engaging the spring, one thereof held interiorly of each member, said resilient means being operative to resist said relative movement of the members.

4. Chucking mechanism comprising in combination, a chuck, an operating tube therefor, a thrust member engaging the same, a finger holding member, resilient means connecting said members together and located interiorly thereof, a finger pivoted to said holding member and engaging the thrust member, and a sliding wedge adapted to engage said finger for shifting said thrust member and holding member one relatively to the other, said members having their juxtaposed faces in fixed rotative relation to each other.

5. Chucking mechanism comprising in combination a chuck, an operating tube therefor, a thrust member engaging the same, a finger holding member, resilient means connecting said members together and located interiorly thereof, a finger pivoted to said finger holding member interiorly thereof and engaging said thrust member, and a sliding wedge adapted to engage said finger for shifting said thrust member and holding member one relatively to the other, said members having their juxtaposed faces in fixed rotative relation to each other.

6. The combination of a spindle, a finger holder, a finger pivotally connected thereto, means for swinging an end of said finger away from the spindle, a stop for limiting the movement of the finger toward the spindle, and resilient means connected to the holder for forcing said finger against the stop.

7. Chuck operating mechanism of the class described comprising in combination a chuck, a spindle, a finger holder mounted on said spindle, thrust means cooperating with the holder, fingers pivoted to the holder and coacting with the thrust means, a spring carried by said holder interiorly thereof and connected to said thrust means, and stop means carried by the holder for limiting the movement of the fingers toward the spindle.

8. Chucking mechanism comprising in combination a chuck, an operating member connected to said chuck, a spindle, a finger holder adjustably carried by said spindle, thrust means comprising a thrust ring, a thrust collar engaging said operating member, a pair of fingers pivoted to said holder interiorly thereof and having each a hook-shaped thrust part engaging said thrust collar, a sliding wedge adapted to engage said fingers for shifting said thrust collar and thrust ring relatively to said finger holding member thereby to shift said operating member for operating the chuck, and resilient means connecting said finger holder and thrust ring together and comprising a spring and a pin, one thereof held interiorly of each.

9. Chucking mechanism comprising in combination a chuck, an operating member connected to said chuck, a spindle, a finger holder adjustably carried by said spindle, thrust means comprising a thrust ring, a thrust collar engaging said operating member, a pair of fingers pivoted to said holder interiorly thereof and having each a hook-shaped thrust part engaging said thrust collar, a sliding wedge adapted to engage said fingers for shifting said thrust collar and thrust ring relatively to said finger holding member thereby to shift said operating member for operating the chuck, and resilient means connecting said finger holder and thrust ring together and comprising a spring and a pin, one thereof held interiorly of each, said finger holder having stop means for limiting the movement of the fingers relatively to the spindle.

10. The combination of a chuck, operating means therefor, a finger holder, a thrust plate, fingers pivoted to said holder, means connecting said plate and operating means together, and resilient means connecting said holder and plate together, the fingers operative to shift the thrust plate in one direction against the action of said resilient means.

11. The combination of a chuck, a finger holder, fingers carried thereby, a pair of connected thrust members, one thereof coacting with the fingers and one thereof resiliently connected to the holder, said fingers operative to shift the thrust members against the action of the resilient connection.

12. The combination of a chuck, a finger holder, fingers carried thereby, thrust means having a part coacting with the fingers and a part resiliently connected to the holder, said fingers operative to cause relatively shiftable movement of the thrust means and the holder against the action of said resilient connection.

13. The combination of a chuck, a finger holder, fingers carried thereby, thrust means having a part coacting with the fingers and a part resiliently connected to the holder, said fingers operative to cause relatively shiftable movement of the thrust means and the holder against the action of said resilient connection, said holder and thrust means being rotatable together.

14. The combination of a chuck, a finger holder, fingers carried thereby, thrust means having a part coacting with the fingers and a part resiliently connected to the holder, said fingers operative to cause relatively shiftable movement of the thrust means and the holder against the action of the resilient connection, and a finger stop carried by said holder.

15. The combination of a chuck, operating means therefor, a finger holder and a member shiftable one relatively to the other and rotatable together, fingers carried by the holder, a resilient connection between the holder and member, said member and holder having one a connection with said operating means, and said fingers being operative to cause relative shiftable movement of the holder and member against the action of said resilient connection.

Signed at Cleveland, Cuyahoga County, Ohio, this 29th day of April, 1921.

ALFRED E. DRISSNER.